(12) United States Patent
Bartsch

(10) Patent No.: US 7,168,542 B2
(45) Date of Patent: Jan. 30, 2007

(54) TRANSMISSION HAVING A POST CLUTCH ACTUATOR RELIEF VALVE

(75) Inventor: Christopher Paul Bartsch, Peoria, IL (US)

(73) Assignee: Caterpillar Inc, Peoria, IL (US)

(*) Notice: Subject to any disclaimer, the term of this patent is extended or adjusted under 35 U.S.C. 154(b) by 135 days.

(21) Appl. No.: 10/925,938

(22) Filed: Aug. 26, 2004

(65) Prior Publication Data

US 2006/0042899 A1    Mar. 2, 2006

(51) Int. Cl.
*F16D 25/10* (2006.01)
(52) U.S. Cl. .................... 192/87.13; 192/3.58
(58) Field of Classification Search ............ None
See application file for complete search history.

(56) References Cited

U.S. PATENT DOCUMENTS

| | | | |
|---|---|---|---|
| 2,916,940 A | 12/1959 | Neracher et al. | |
| 4,379,674 A * | 4/1983 | Meisel et al. | 414/699 |
| 4,676,348 A | 6/1987 | Coutant | |
| 4,676,349 A | 6/1987 | Coutant | |
| 4,704,922 A | 11/1987 | Suketomo et al. | |
| 5,224,392 A | 7/1993 | Hutchison et al. | |
| 5,240,093 A * | 8/1993 | Wagner et al. | 192/3.58 |
| 5,941,358 A | 8/1999 | Hosseini et al. | |
| 6,619,457 B2 | 9/2003 | Keener | |
| 6,722,464 B2 | 4/2004 | Nakatani et al. | |
| 2003/0047410 A1* | 3/2003 | Busold et al. | 192/87.11 |

* cited by examiner

*Primary Examiner*—Richard M. Lorence
(74) *Attorney, Agent, or Firm*—Finnegan, Henderson, Farabow, Garrett & Dunner

(57) ABSTRACT

A transmission is provided that has a reservoir configured to hold a supply of fluid and a source configured to pressurize the fluid. The transmission also has a manifold configured to receive the pressurized fluid and a plurality of control valves fluidly communicating with the manifold in parallel relation. The transmission further has a pressure relief valve disposed downstream of the manifold and configured to selectively fluidly communicate the manifold with the reservoir.

39 Claims, 7 Drawing Sheets

TRANSMISSION HAVING A POST CLUTCH ACTUATOR RELIEF VALVE

TECHNICAL FIELD

The present disclosure relates generally to a transmission and, more particularly, to a transmission having a post clutch actuator relief valve.

BACKGROUND

A work machine such as, for example, an off-highway truck, a loader, a motor grader, or any other work machine known in the art may include a multi-speed bidirectional transmission that has one or more hydraulically actuated friction clutches. These clutches may be selectively engaged to produce a predetermined output ratio of the transmission in either a forward or reverse direction. Clutches of this type may include actuators fluidly connected to a main relief valve, which is configured to control a pressure of a hydraulic fluid supplied to the actuators by allowing a flow of fluid to bypass the actuators at a predetermined pressure.

One such transmission is described in U.S. Pat. No. 5,941,358 (the '358 patent) to Hosseini et al. The '358 patent teaches a power distribution system having a pump, a plurality of fluid-actuated clutches, and a plurality of proportional control valves configured to selectively direct pressurized fluid from the pump to the clutches. The '358 patent also teaches a pressure relief valve being disposed upstream of the plurality of proportional control valves for controlling a fluid pressure supplied to the proportional control valves. When an input mechanism of the '358 patent is in a neutral position, all of the flow from the pump is bypassed across the pressure relief valve to a reservoir at a predetermined pressure. When the input mechanism is in an engaged gear position, fluid is initially allowed to flow through one or more of the control valves to actuate one or more of the clutches. Once the appropriate clutches are actuated, all of the flow from the pump is again bypassed across the pressure relief valve at the predetermine pressure.

Although the pressure relief valve of the '358 patent may sufficiently control the pressure of the fluid supplied to the control valves, its location relative to the control valves may be problematic. In particular, because the pressure relief valve bypasses fluid before the fluid flows past the control valves, the control valves may be exposed to stagnant fluid for a majority of the operational time of the transmission. This stagnant fluid may allow for the deposit of dirt and debris in the immediate vicinity of the control valves, which may ultimately result in malfunction or premature failure of the control valves.

The disclosed transmission is directed to overcoming one or more of the problems set forth above.

SUMMARY OF THE INVENTION

In one aspect, the present disclosure is directed to a transmission that includes a reservoir configured to hold a supply of fluid and a source configured to pressurize the fluid. The transmission also includes a manifold configured to receive the pressurized fluid and a plurality of control valves fluidly communicating with the manifold in parallel relation. The transmission further includes a pressure relief valve disposed downstream of the manifold and configured to selectively fluidly communicate the manifold with the reservoir.

In another aspect, the present disclosure is directed to a transmission that includes a reservoir configured to hold a supply of fluid and a source configured to pressurize the fluid. The transmission also includes a plurality of control valves configured to receive the pressurized fluid in series relation and a pressure relief valve disposed downstream of the plurality of control valves. The pressure relief valve is configured to selectively fluidly communicate the plurality of control valves with the reservoir.

In yet another aspect, the present disclosure is directed to a method of operating a transmission that includes pressurizing a fluid and directing the pressurized fluid through a manifold to a plurality of control valves. The plurality of control valves fluidly communicate with the manifold in parallel relation. The method further includes selectively passing fluid with a pressure relief valve to a reservoir from a point downstream of the manifold.

DETAILED DESCRIPTION

Figure 1:
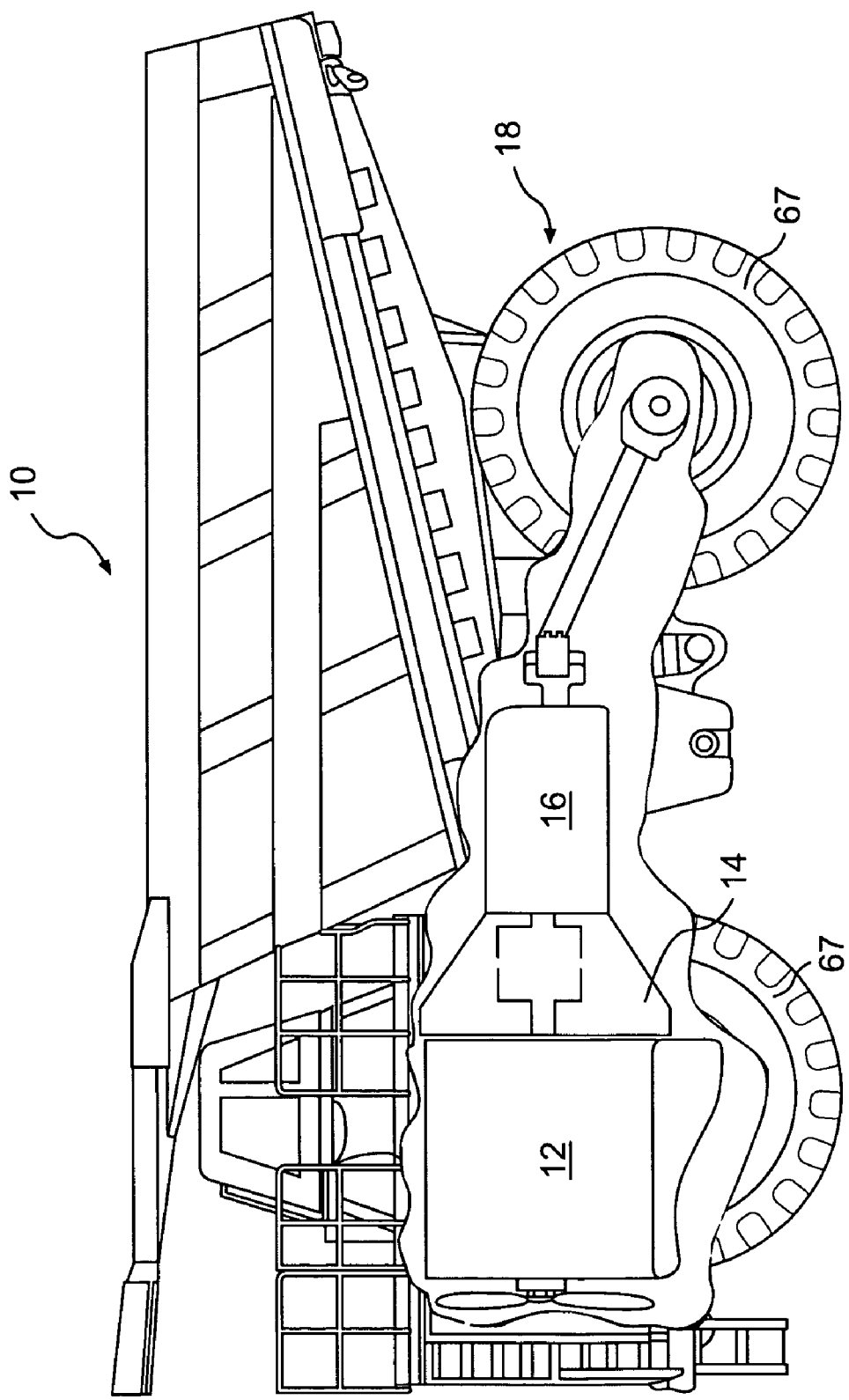
FIG. 1 is a diagrammatic illustration of a work machine having an exemplary disclosed transmission.

FIG. 1 illustrates an exemplary work machine 10. Work machine 10 may be a fixed or mobile machine that performs some type of operation associated with an industry such as mining, construction, farming, transportation, or any other industry known in the art. For example, work machine 10 may be an earth moving machine such as an off-highway truck, a loader, a motor grader, or any other earth moving machine. Work machine 10 may alternately be a pump, a marine vessel, a passenger vehicle, or any other suitable operation-performing work machine. Work machine 10 may include a power source 12, a torque converter 14, and a transmission 16 operably connected to a traction device 18.

Power source 12 may be configured to produce a power output and may include an internal combustion engine such as, for example, a diesel engine, a gasoline engine, a natural gas engine, or any other engine apparent to one skilled in the art. Power source 12 may, alternately, include another source of power such as a furnace, a battery, a fuel cell, or any other source of power known in the art.

Torque converter 14 (referring to FIG. 1) may be a hydraulic device configured to couple transmission 16 to power source 12. Torque converter 14 may allow power source 12 to rotate somewhat independently of transmission 16. It is contemplated that torque converter 14 may alternately be embodied in a non-hydraulic device such as, for example, a mechanical diaphragm clutch.

Figure 2:
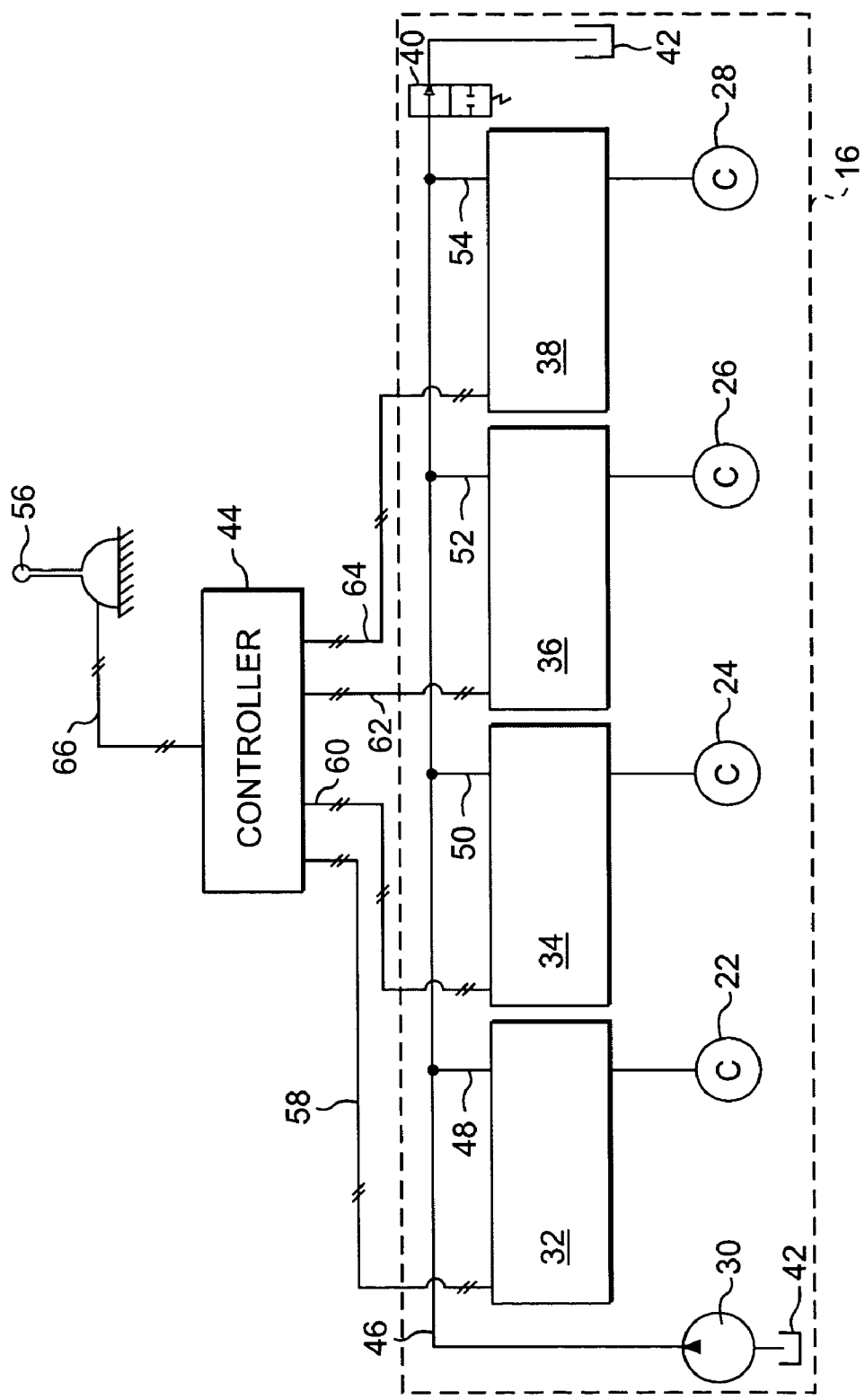
FIG. 2 is a schematic illustration of an exemplary disclosed hydraulic circuit for the transmission of FIG. 1.

As illustrated in FIG. 2, transmission 16 may include numerous components that interact to transmit power from power source 12 to traction device 18. In particular, transmission 16 may be multi-speed bidirectional mechanical transmission having a plurality of fluid activated clutches and control valves. In one embodiment, transmission 16 includes four clutches 22, 24, 26, 28 connected to a pump 30 through four control valves 32, 34, 36, 38. It is contemplated that additional or fewer clutches and/or control valves may be included within transmission 16. Transmission 16 may also include a pressure relief valve 40, a fluid reservoir 42, and a controller 44.

Clutches 22–28 may be configured to selectively receive pressurized fluid from pump 30 causing engagement of portions of a gear train (not shown) within transmission 16. Each of clutches 22–28 may be fluidly connected to pump 30 in parallel relation by way of a manifold 46 and distribution lines 48, 50, 52, and 54, respectively. Each of clutches 22–28 may include an interior actuating chamber (not shown) that, when filled with pressurized fluid, displaces a piston (not shown) moving the piston toward one or more clutch disks (not shown) and plates (not shown), also known as a clutch pack. As the piston "touches up" to the clutch pack, the actuating chamber is full of fluid and the clutch is engaged. The combination of engaged clutches determines the output speed ratio of transmission 16.

Pump 30 may be configured to produce a flow of pressurized fluid and may include a variable displacement pump, a fixed displacement pump, a variable flow pump, or any other source of pressurized fluid known in the art. Pump 30 may be drivably connected to power source 12 by, for example, a countershaft (not shown), a belt (not shown), an electrical circuit (not shown), or in any other suitable manner. It is contemplated that pump 30 may alternately be drivably connected to transmission 16. Pump 30 may be dedicated to supplying pressurized fluid only to transmission 16. It is contemplated that pump 30 may alternately supply pressurized fluid to both power source 12 and transmission 16.

Control valves 32–38 may be disposed within distribution lines 48–54, respectively, between clutches 22–28 and manifold 46 and located at a point gravitationally higher than manifold 46. Because control valves 32–38 are disposed at a point gravitationally higher than manifold 46, the deposit of dirt and debris within distribution lines 48–54 may be minimized. In particular, if dirt or debris is deposited within one of distribution lines 48–54, gravity may help to draw the dirt or debris back into the main flow of pressurized fluid within manifold 46 to be flushed through pressure relief valve 40 to reservoir 42.

Control valves 32–38 may be configured to regulate a flow of pressurized fluid to the interior actuating chambers of clutches 22–28. Specifically, each of control valves 32–38 may include a two-position valve mechanism (not shown) that is solenoid actuated and configured to actuate one of clutches 22–28. Each of the two-position valve mechanisms may be movable between a first position at which fluid is allowed to flow into an associated actuating chamber and a second position at which fluid flow is blocked from the actuating chamber. It is contemplated that more than one clutch may be associated with a single control valve. It is further contemplated that each control valve may include additional or different mechanisms such as, for example, a proportional valve, a pilot valve configured to control a pressure of the fluid entering the two-position valve mechanisms and interior actuating chamber of the associated clutch or clutches, or any other mechanisms known in the art.

Pressure relief valve 40 may be disposed downstream of manifold 46 and configured to selectively pass fluid to reservoir 42 in response to a pressure of the fluid within manifold 46. By way of example, pressure relief valve 40 may include a valve element (not shown) that is spring biased toward a flow blocking position and movable toward a flow passing position in response to a pressure of the fluid within manifold 46. When the pressure within manifold 46 exceeds a predetermined threshold, the force generated by the fluid pressure acting on the valve element may overcome the spring force allowing the valve element to move to the second position. In this manner, pressure relief valve 40 may function to maintain a predetermined pressure within manifold 46.

Reservoir 42 may include a tank configured to hold a supply of fluid. The fluid may include, for example, an engine lubrication oil, a transmission lubrication oil, a separate hydraulic oil, or any other fluid known in the art. One or both of power source 12 and transmission 16 may draw fluid from and return fluid to reservoir 42. It is also contemplated that power source 12 and transmission 16 may be connected to separate fluid reservoirs.

Controller 44 may be embodied in a single microprocessor or multiple microprocessors that include a means for controlling an operation of transmission 16. Numerous commercially available microprocessors can be configured to perform the functions of controller 44. It should be appreciated that controller 44 could readily be embodied in a general work machine microprocessor capable of controlling numerous work machine functions. Various other known circuits may be associated with controller 44, including power supply circuitry, signal-conditioning circuitry, solenoid driver circuitry, communication circuitry, and other appropriate circuitry.

Controller 44 may be configured to actuate control valves 32–38 in response to a signal from an input device 56. Specifically, controller 44 may be in communication with control valves 32–38 via communication lines 58, 60, 62, and 64 respectively and with input device 56 via a communication line 66. Input device 56 may be disposed within an operator cabin of work machine 10 and configured to generate a signal indicative of a desired transmission output speed ratio. Controller 44 may receive the signal generated by input device 56 in response to an operator input and actuate one or more of control valves 32–38 to fill the actuating chambers associated with specific clutches 22–28 to produce the desired transmission output speed ratio. It is also contemplated that the operator input may alternately designate a maximum transmission output speed ration and that controller 44 may automatically actuate one or more of control valves 32–38 in response to a transmission speed or fluid pressure input to produce a transmission output speed ratio less than the maximum.

Traction Device 18 (referring to FIG. 1) may include wheels 67 located on each side of work machine 10 (only one side shown). Alternately, traction device 18 may include tracks, belts or other driven traction devices. Traction device 18 may be driven by transmission 16 to rotate in accordance with an output rotation of transmission 16.

Figure 3:
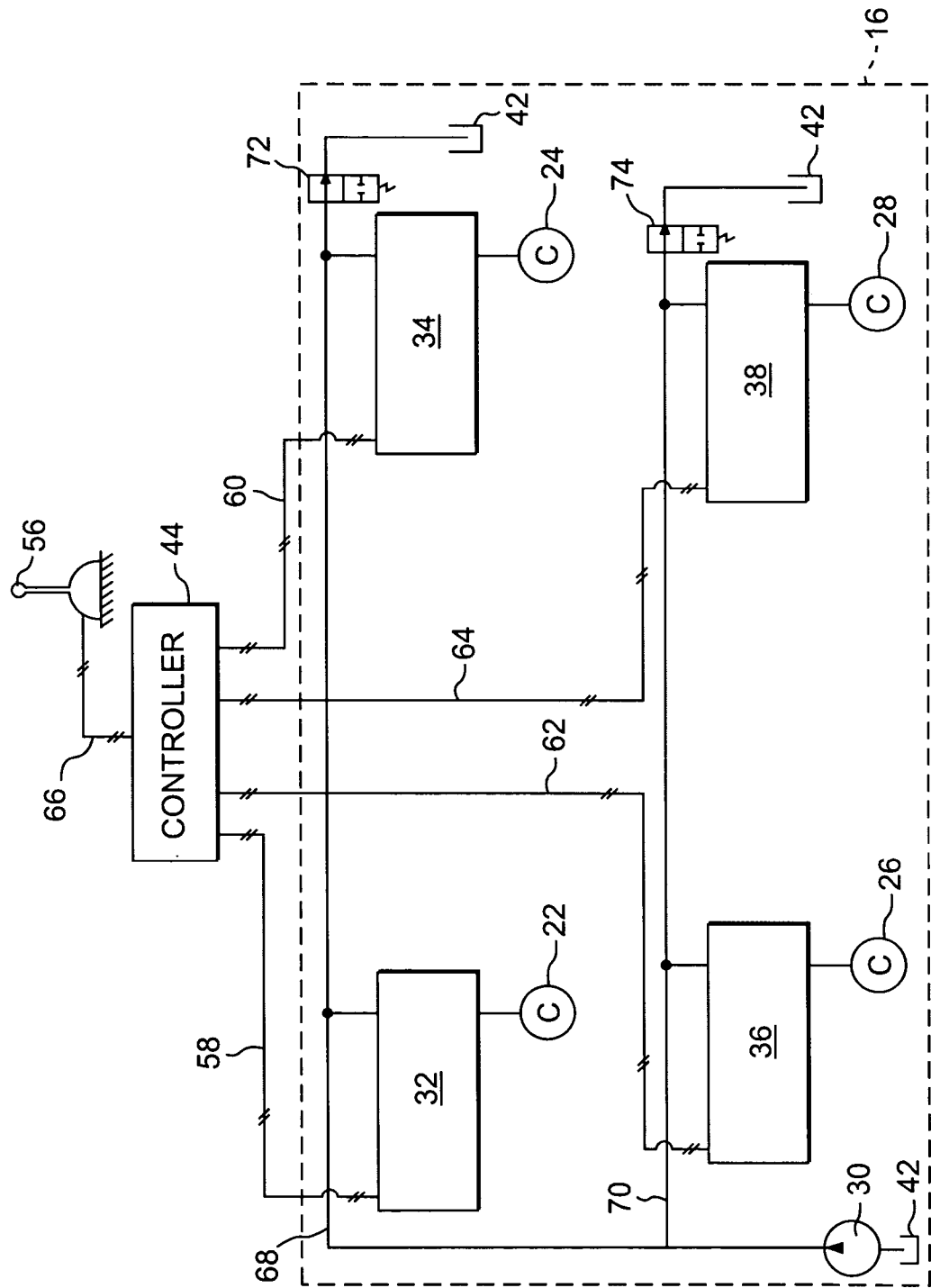
FIG. 3 is a schematic illustration of an exemplary disclosed hydraulic circuit for the transmission of FIG. 1.

FIG. 3 illustrates another exemplary embodiment of transmission 16. Similar to FIG. 2, transmission 16 of FIG. 3 may include control valves 32–38 fluidly connected to pump 30 to control the filling of clutches 22–28. However, in contrast to a single manifold 46 of FIG. 2, transmission 16 of FIG. 3 may include two separate manifolds and two separate pressure relief valves. In particular, control valves 32 and 34 may be fluidly connected in parallel to a first manifold 68, while control valves 36 and 38 may be fluidly connected in parallel to a second manifold 70. First and second manifolds 68 and 70 may receive pressurized fluid from pump 30 in parallel relation. A first pressure relief valve 72 may be disposed downstream of first manifold 68 and configured to selectively fluidly communicate first manifold 68 with reservoir 42. A second pressure relief valve 74 may be disposed downstream of second manifold 70 and configured to selectively fluidly communicate second manifold 70 with reservoir 42.

Figure 4:
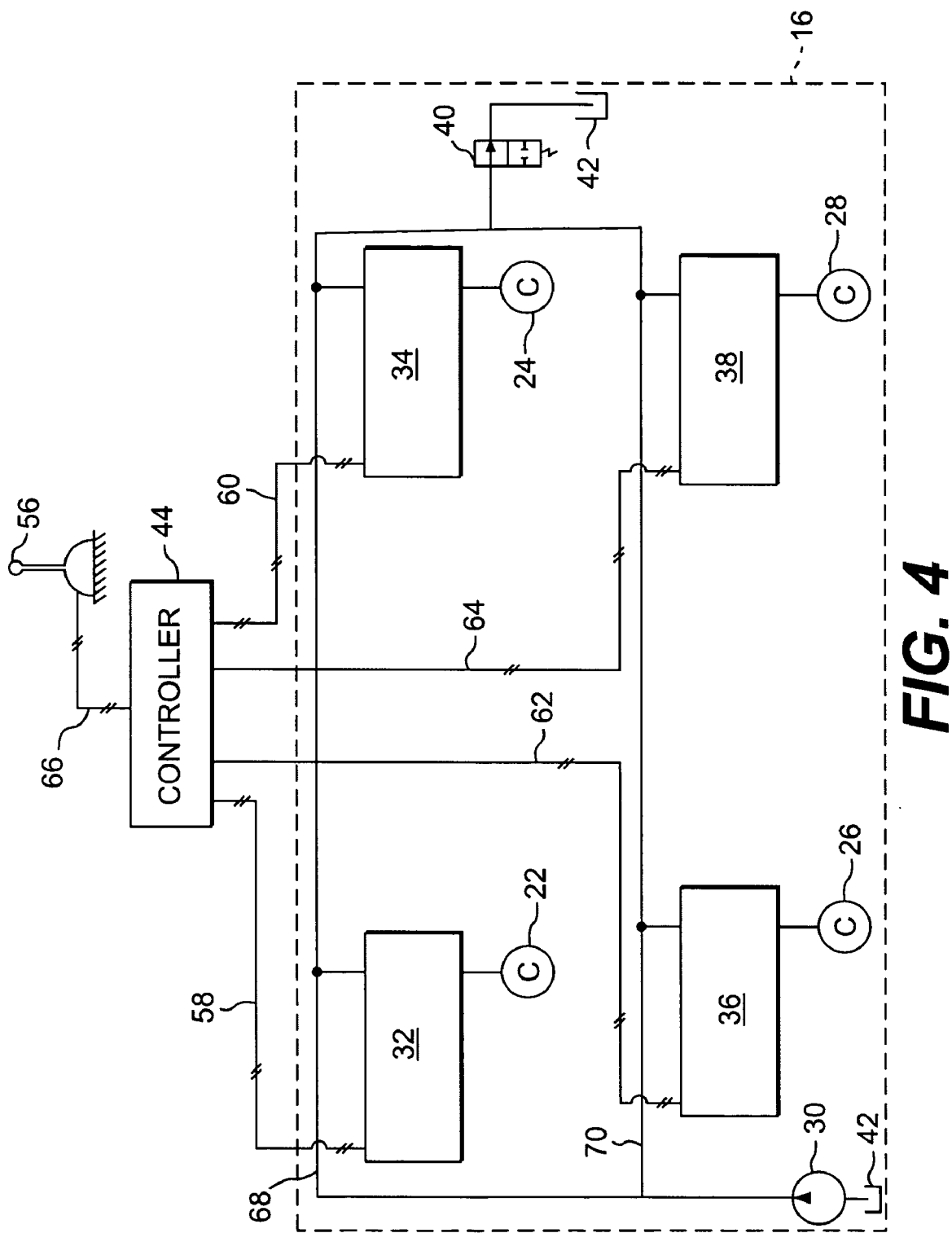
FIG. 4 is a schematic illustration of an exemplary disclosed hydraulic circuit for the transmission of FIG. 1.

FIG. 4 illustrates another exemplary embodiment of transmission 16. Similar to FIG. 3, transmission 16 of FIG. 3 may include control valves 32 and 34 fluidly connected to first manifold 68 in parallel and control valves 36 and 38 fluidly connected to second manifold 70 in parallel. However, in contrast to FIG. 3, transmission 16 of FIG. 4 may include one pressure relief valve 40 disposed downstream of both first and second manifolds 68 and 70 and configured to simultaneously and selectively fluidly communicate both first and second manifolds 68 and 70 with reservoir 42.

Figure 5:
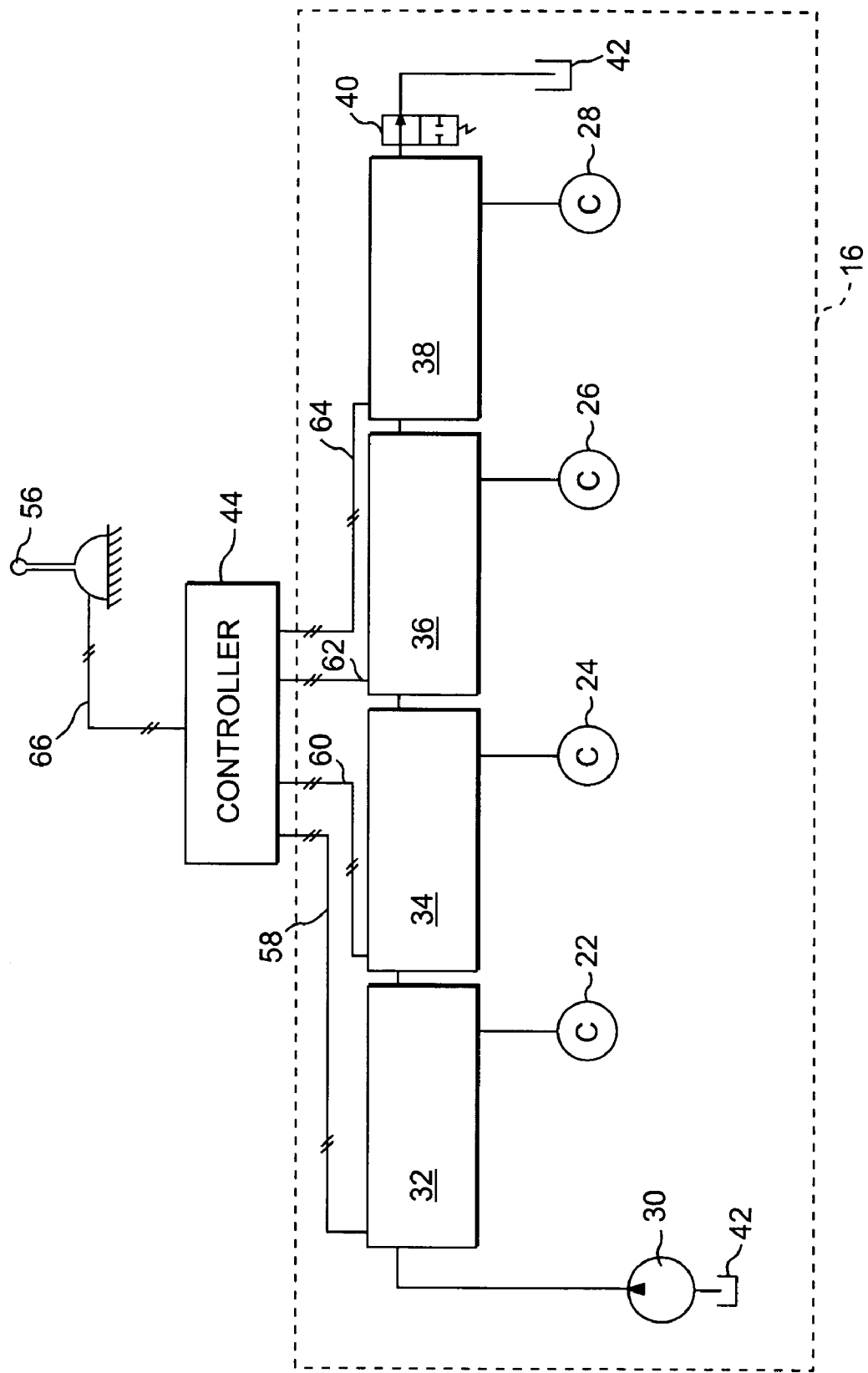
FIG. 5 is a schematic illustration of an exemplary disclosed hydraulic circuit for the transmission of FIG. 1.

FIG. 5 illustrates another exemplary embodiment of transmission 16. Similar to FIG. 2, transmission 16 of FIG. 5 may include control valves 32–38 fluidly connected to pump 30 to control the filling of clutches 22–28. However, in contrast to FIG. 2, transmission 16 of FIG. 5 may omit manifold 46, with control valves 32–38 being configured to receive pressurized fluid from pump 30 in a series relationship.

Figure 6:
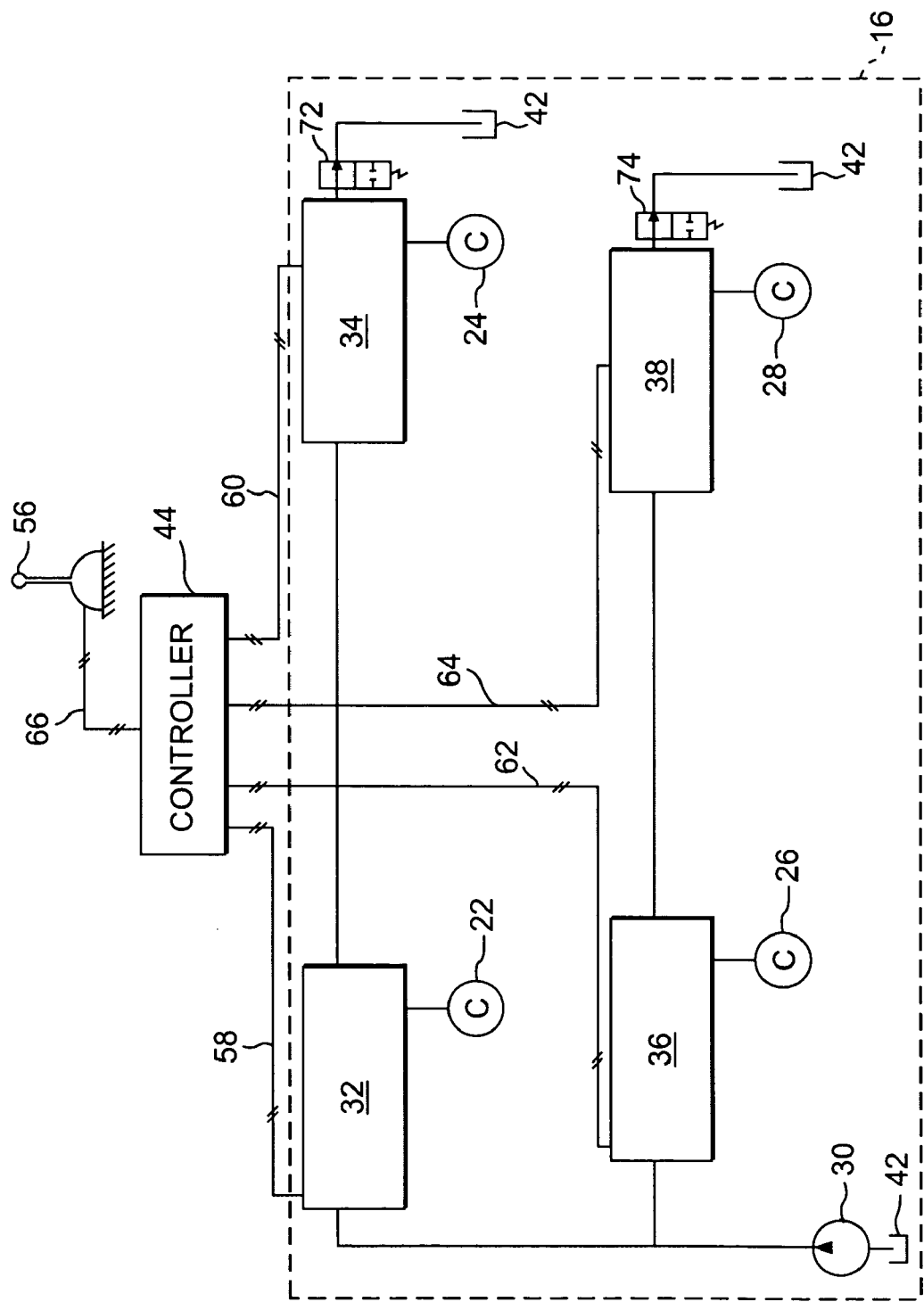
FIG. 6 is a schematic illustration of an exemplary disclosed hydraulic circuit for the transmission of FIG. 1.

FIG. 6, illustrates another exemplary embodiment of transmission 16. Similar to FIG. 3, transmission 16 of FIG. 6 may include control valves 32–38 fluidly connected to pump 30 to control the filling of clutches 22–28. However, in contrast to FIG. 3, transmission 16 of FIG. 6 may omit both first and second manifolds 68, 70, and dispose control valves 32 and 34 in a first series relationship and control valves 36 and 38 in a second series relationship. Control valves 32 and 34 may receive a flow of pressurized fluid from pump 30 in parallel to a flow of pressurized fluid from pump 30 received by control valves 36 and 38. Pressure relief valve 72 may be disposed downstream of control valves 32 and 34 and configured to selectively fluidly communicate control valves 32 and 34 with reservoir 42. Pressure relief valve 74 may be disposed downstream of control valves 36 and 38 and configured to selectively fluidly communicate control valves 36 and 38 with reservoir 42

Figure 7:
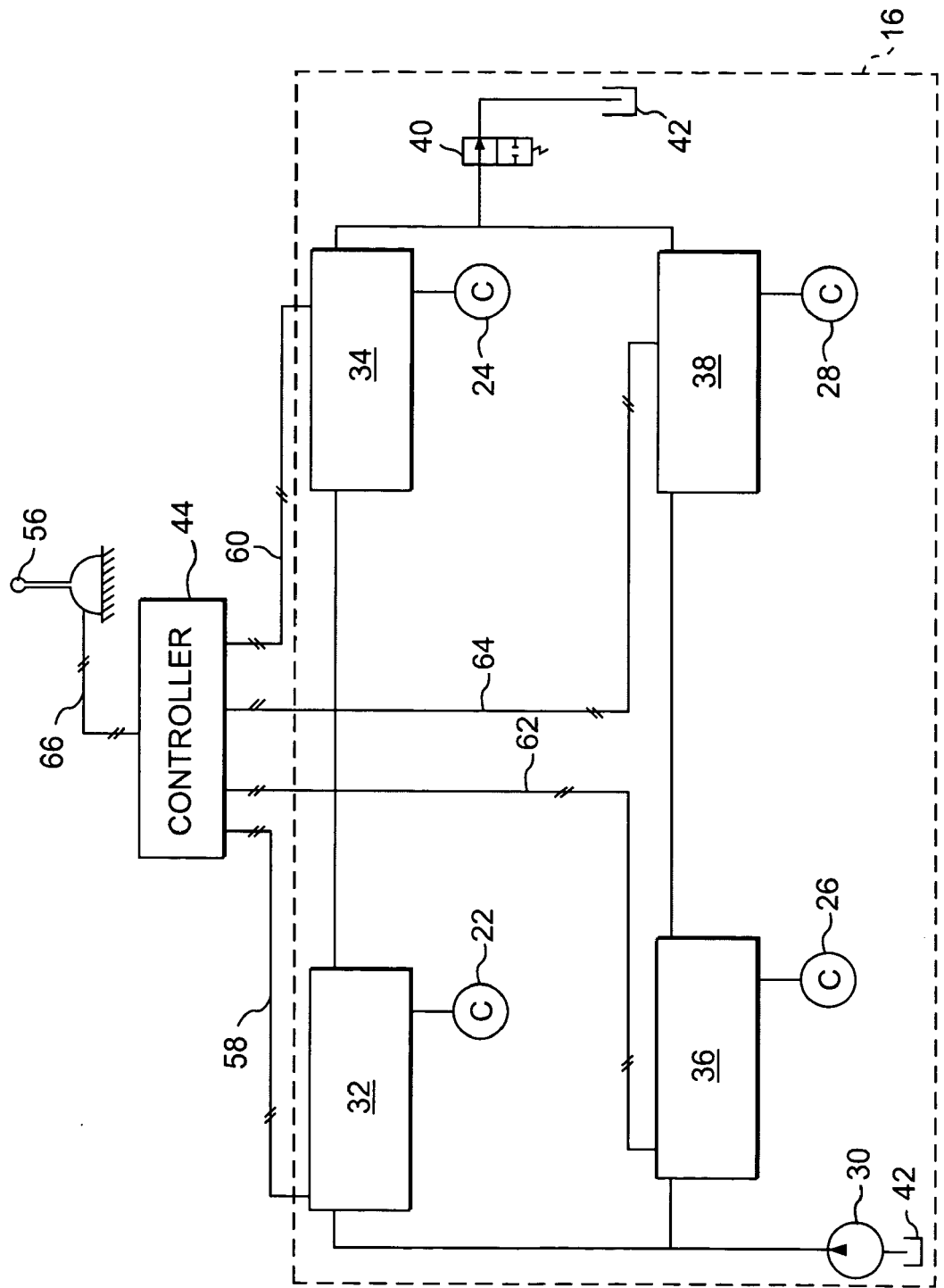
FIG. 7 is a schematic illustration of an exemplary disclosed hydraulic circuit for the transmission of FIG. 1.

FIG. 7 illustrates a final exemplary embodiment of transmission 16. Similar to FIG. 6, transmission 16 of FIG. 7 may include control valves 32 and 34 fluidly disposed in a first series relationship and control valves 36 and 38 fluidly disposed in a second series relationship. However, in contrast to FIG. 6, transmission 16 of FIG. 7 may include one pressure relief valve 40 disposed downstream of all control valves and configured to simultaneously fluidly communicate all control valves 32–38 with reservoir 42.

INDUSTRIAL APPLICABILITY

The disclosed transmission may reduce the amount of stagnant fluid in an immediate vicinity of one or more control valves and the amount of time that the fluid remains stagnant. A reduction the amount of stagnant fluid and the a reduction in the time that the fluid remains stagnant may result in the reduction of dirt and debris deposited on or near the control valves, thereby resulting in an increase in the component life of the control valves.

Referring to FIG. 2, when transmission 16 is in operation, pump 30 may pressurize a fluid from reservoir 42 in preparation for transmission gear engagement. When transmission 16 is in a neutral condition, all fluid pressurized by pump 30 may be directed from reservoir 42 through manifold 46 to pressure relief valve 40. While pressure relief valve 40 is in a closed position, the pressure within manifold 46 may build until it reaches a minimum pressure threshold set by a spring within pressure relief valve 40. Upon reaching the minimum pressure threshold, the fluid within manifold 46 may force pressure relief valve 40 to open and allow the pressurized fluid to spill back to reservoir 42.

A work machine operator may select a desired transmission output gear ratio or a maximum transmission output speed ratio by moving input device 56. When the operator selects a particular gear ratio, a predetermined combination of one or more of control valves 32–38, which are in fluid communication with manifold 46, may actuate to allow the pressurized fluid within manifold 46 to enter associated actuation chambers, thereby engaging one or more of clutches 22–28. When the operator selects a maximum transmission output ratio, controller 44 may automatically actuate a predetermined combination of one or more of control valves 32–38, thereby engaging one or more of clutches 22–28 to produce a transmission output speed ratio less than the maximum. During filling of clutches 22–28, the pressure within manifold 46 may drop below the pressure threshold of pressure relief valve 40 allowing pressure relief valve 40 to close and block fluid from spilling to reservoir 42. Upon completion of filling, pressure within manifold 46 may again rise to the pressure threshold of pressure relief valve 40, forcing pressure relief valve 40 to open and spill the pressurized fluid back to reservoir 42. In this manner, pressure relief valve 40 may function to maintain a predetermined pressure level of the fluid supplied to clutches 22–28.

Similar to FIG. 2, the output gear ratio of transmission 16 of FIG. 3 may be automatically selected by controller 44 or manually selected by moving input device 56. When the particular gear ratio is selected, a predetermined combination of one or more of control valves 32–38, which are in fluid communication with either first or second manifolds 68, 70, may actuate to allow the pressurized fluid within the first or second manifolds 68, 70 to enter associated actuation chambers, thereby engaging one or more of clutches 22–28. During filling of clutches 22–28, the pressure within first manifold 68 and second manifold 70 may drop below the pressure threshold of associated first and second pressure relief valves 72, 74 allowing first and second pressure relief valves 72, 74 to close and block fluid from spilling to reservoir 42. Upon completion of filling, pressure may again rise within first manifold 68 and second manifold 70 to the pressure threshold of first and second pressure relief valves 72, 74, again forcing first and second pressure relief valve 72, 74 to open and spill the pressurized fluid back to reservoir 42. In this manner, first pressure relief valve 72 may function to maintain a predetermined pressure level of the fluid within first manifold 68 while second pressure relief valve 74 may function to maintain a predetermined pressure level of the fluid within second manifold 70.

Similar to FIG. 3, the output gear ratio of transmission 16 of FIG. 4 may be automatically selected by controller 44 or manually selected by moving input device 56. When the particular gear ratio is selected, a predetermined combination of one or more of control valves 32–38, which are in fluid communication with either first or second manifolds 68, 70, may actuate to allow the pressurized fluid within first or second manifolds 68, 70 to enter associated actuation chambers, thereby engaging one or more of clutches 22–28. During filling of clutches 22–28, the pressure within first manifold 68 and second manifold 70 may drop below the pressure threshold of pressure relief valve 40 allowing pressure relief valve 40 to close and block fluid from spilling from either first manifold 68 and second manifold 70 to reservoir 42. Upon completion of filling, pressure may again rise within first manifold 68 and second manifold 70 to the pressure threshold of pressure relief valve 40, again forcing pressure relief valve 40 to open and spill the pressurized fluid to reservoir 42. In this manner, pressure relief valve 40 may function to simultaneously maintain a predetermined pressure level of the fluid within first manifold 68 and second manifold 70.

Similar to FIG. 2, the output gear ratio of transmission 16 of FIG. 5 may be automatically selected by controller 44 or manually selected by moving input device 56. When the particular gear ratio is selected, a predetermined combination of one or more of control valves 32–38, which are disposed in series communication with each other, may actuate to direct the pressurized fluid from pump 30 to associated actuation chambers, thereby engaging one or more of clutches 22–28. During filling of clutches 22–28, the pressure of the fluid flowing downstream of the actuating clutches may drop below the pressure threshold of pressure relief valve 40 allowing pressure relief valve 40 to close and block fluid from spilling to reservoir 42. Upon completion of filling, the pressure of the fluid flowing past all of control valves 32–38 may again rise to the pressure threshold of pressure relief valve 40, again forcing pressure relief valve 40 to open and spill the pressurized fluid to reservoir 42. In this manner, pressure relief valve 40 may function to maintain a predetermined pressure level of the fluid supplied to control valves 32–38.

Similar to FIG. 3, the output gear ratio of transmission 16 of FIG. 6 may be automatically selected by controller 44 or manually selected by moving input device 56. When the particular gear ratio is selected, a predetermined combination of one or more of control valves 32 and 34, which are disposed in series fluid communication with each other and/or control valves 36 and 38, which are disposed in series fluid communication with each other and in parallel communication with control valves 32 and 34, may actuate to allow the pressurized fluid from pump 30 to enter associated actuation chambers, thereby engaging one or more of clutches 22–28. During filling of clutches 22–28, the pressure downstream of the actuating control valves may drop below the pressure threshold of first or second pressure relief valves 72, 74 allowing first or second pressure relief valves 72, 74 to close and block fluid from spilling from either the parallel path through control valves 32 and 34 or the parallel path through control valves 36 and 38 to reservoir 42. Upon completion of filling, pressure of the fluid supplied to control valves 32–38 may again rise to the pressure threshold of first or second pressure relief valves 72, 74, again forcing first or second pressure relief valves 72, 74 to open and spill the pressurized fluid to reservoir 42. In this manner, first and second pressure relief valves 72, 74 may function to maintain a predetermined pressure level of the fluid supplied to control valves 32–38.

Similar to FIG. 6, the output gear ratio of transmission 16 of FIG. 7 may be automatically selected by controller 44 or manually selected by moving input device 56. When the particular gear ratio is selected, a predetermined combination of one or more of control valves 32 and 34, which are disposed in series fluid communication with each other and/or control valves 36 and 38, which are disposed in series fluid communication with each other and in parallel communication with control valves 32 and 34, may actuate to allow the pressurized fluid from pump 30 to enter associated actuation chambers, thereby engaging one or more of clutches 22–28. During filling of clutches 22–28 the pressure downstream of the actuating control valves may drop below the pressure threshold of pressure relief valve 40 allowing pressure relief valve 40 to close and block fluid from spilling from either the parallel path through control valves 32 and 34 or the parallel path through control valves 36 and 38 to reservoir 42. Upon completion of filling, pressure of the fluid supplied to control valves 22–28 may again rise to the pressure threshold of pressure relief valve 40, again forcing pressure relief valve 40 to open and spill the pressurized fluid back to reservoir 42. In this manner, pressure relief valve 40 may function to maintain a predetermined pressure level of the fluid supplied to control valves 32–38.

Several advantages are realized because pressure relief valves 40, 72, and 74 are disposed downstream of manifolds 46, 68, and 70 and control valves 32–38 and because control valves 32–38 are located at a point gravitationally higher than manifolds 46, 68, and 70. During a majority of the operational time of transmission 16, a flow of pressurized fluid may be directed past each control valve 32–38 to spill into reservoir 42. Because the pressurized fluid is continuously flowing past control valves 32–38, little or no fluid may be allowed to stagnate in the immediate vicinity of any of control valves 32–38, which may limit the deposit of dirt and debris on or around control valves 32–38. In addition, because control valves 32–38 are located at a point gravitationally higher than manifolds 46, 68, and 70, any dirt or debris that may initially be deposited in the vicinity of control valves 32–38 may be pulled by gravity back into the main flow of pressurized fluid to be flushed back to reservoir 42.

It will be apparent to those skilled in the art that various modifications and variations can be made to the transmission of the present disclosure. Other embodiments of the transmission will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A transmission, comprising:
   a reservoir configured to hold a supply of fluid;
   a source configured to pressurize the fluid;
   a manifold configured to receive the pressurized fluid;
   a plurality of control valves fluidly communicating with the manifold in parallel relation;
   a pressure relief valve disposed downstream of the manifold and the control valves, the pressure relief valve being configured to selectively fluidly communicate the manifold with the reservoir; and
   a distribution line dedicated to communicating the pressurized fluid from the manifold to the pressure relief valve.

2. The transmission of claim 1, further including a plurality of fluid actuated clutches, each of the fluid actuated clutches being associated with one of the plurality of control valves.

3. The transmission of claim 1, further including a controller in communication with each of the plurality of control valves and configured to selectively actuate the plurality of control valves in response to a predetermined condition.

4. The transmission of claim 3, wherein the predetermined condition is a desired transmission output gear ratio input by an operator.

5. The transmission of claim 1, wherein the manifold is a first manifold, the plurality of control valves is a first plurality of control valves, and the transmission further includes:
- a second manifold configured to receive the pressurized fluid in parallel relation to the first manifold, the pressure relief valve being disposed downstream of the first and second manifolds and configured to selectively fluidly communicate both the first and second manifolds with the reservoir; and
- a second plurality of control valves fluidly communicating with the second manifold in parallel relation.

6. The transmission of claim 1, wherein the manifold is a first manifold, the plurality of control valves is a first plurality of control valves, the pressure relief valve is a first pressure relief valve downstream of the first manifold and configured to selectively fluidly communicate the first manifold with the reservoir, and the transmission further includes:
- a second manifold configured to receive the pressurized fluid in parallel relation to the first manifold;
- a second plurality of control valves fluidly communicating with the second manifold in parallel relation; and
- a second pressure relief valve disposed downstream of the second manifold and configured to selectively fluidly communicate the second manifold with the reservoir.

7. The transmission of claim 1, wherein each of the plurality of control valves are located at a point gravitationally higher than the manifold.

8. A transmission, comprising:
- a reservoir configured to hold a supply of fluid;
- a source configured to pressurize the fluid;
- a plurality of control valves configured to receive the pressurized fluid;
- a pressure relief valve disposed downstream of the plurality of control valves and configured to selectively communicate the plurality of control valves with the reservoir;
- a plurality of fluid actuated clutches, each of the fluid actuated clutches being associated with one of the plurality of control valves: and
- a distribution line directing the pressurized fluid solely from at least one of the control valves to at least one of the fluid activated clutches.

9. The transmission of claim 8, wherein the plurality of control valves are configured to receive the pressurized fluid in series relation.

10. The transmission of claim 9, further including a plurality of fluid actuated clutches, each of the fluid actuated clutches being associated with one of the plurality of control valves.

11. The transmission of claim 9, further including a controller in communication with each of the plurality of control valves and configured to selectively actuate the plurality of control valves in response to a predetermined condition.

12. The transmission of claim 11, wherein the predetermined condition is a desired transmission output gear ratio input by an operator.

13. The transmission of claim 9, wherein the plurality of control valves is a first plurality of control valves, the transmission further includes a second plurality of control valves fluidly disposed in series relation to each other and in parallel relation to the first plurality of control valves, and the pressure relief valve is disposed downstream of the first and second plurality of control valves and configured to selectively fluidly communicate both the first and second plurality of control valves with the reservoir.

14. The transmission of claim 9, wherein the plurality of control valves is a first plurality of control valves, the pressure relief valve is a first pressure relief valve disposed downstream of the first plurality of control valves and configured to selectively fluidly communicate the first plurality of control valves with the reservoir, and the transmission further includes:
- a second plurality of control valves fluidly disposed in series relation to each other and in parallel relation to the first plurality of control valves; and
- a second pressure relief valve disposed downstream of the second plurality of control valves and configured to selectively fluidly communicate the second plurality of control valves with the reservoir.

15. A method of operating a transmission, comprising:
pressurizing a fluid;
directing the pressurized fluid through a manifold to a plurality of control valves fluidly communicating with the manifold in parallel relation; and
selectively passing fluid with a pressure relief valve to a reservoir from a point downstream of the manifold and the control valves,
communicating the pressurized fluid using a distribution line directing the pressurized fluid solely from the manifold to the pressure relief valve.

16. The method of claim 15, further including selectively actuating at least one of a plurality of control valves to fill at least one of a plurality of clutches with pressurized fluid in response to a predetermined condition.

17. The method of claim 16, wherein the predetermined condition is a desired transmission output gear ratio input by an operator.

18. The method of claim 15, wherein the manifold is a first manifold, the plurality of control valves is a first plurality of control valves, and the method further includes directing the pressurized fluid through a second manifold disposed in parallel relation to the first manifold to a second plurality of control valves disposed in parallel relation to each other.

19. The method of claim 18, wherein selectively passing fluid includes passing fluid from a point downstream of both the first and second manifolds.

20. The method of claim 18, wherein the pressure relief valve is a first pressure relief valve, selectively passing fluid includes passing fluid with the first pressure relief valve from a point downstream of the first manifold, and the method further includes selectively passing fluid with a second pressure relief valve from a point downstream of the second manifold to a reservoir.

21. The method of claim 15, wherein directing the pressurized fluid to the plurality of control valves includes directing the pressurized fluid gravitationally upward from the manifold to the plurality of control valves.

22. A method of operating a transmission, comprising:
pressurizing a fluid;
directing the pressurized fluid through a plurality of control valves;
selectively passing fluid with a pressure relief valve to a reservoir from a point downstream of the plurality of control valves;
selectively actuating at least one of a plurality of control valves to fill at least one of a plurality of clutches with pressurized fluid; and
communicating the pressurized fluid using a distribution line dedicated to communicating the pressurized fluid from at least one of the control valves to at least one of the fluid activated clutches.

23. The method of claim 22, wherein the pressurized fluid is directed through the plurality of control valves in series relation.

24. The method of claim 23, further including selectively actuating at least one of a plurality of control valves to fill at least one of a plurality of clutches with pressurized fluid in response to a predetermined condition.

25. The method of claim 24, wherein the predetermined condition is a desired transmission output gear ratio input by an operator.

26. The method of claim 23, wherein the plurality of control valves is a first plurality of control valves, and the method further includes directing the pressurized fluid through a second plurality of control valves disposed in series relation to each other and in parallel relation to the first plurality of control valves.

27. The method of claim 26, wherein selectively passing fluid includes passing fluid from point downstream of both the first and second plurality of control valves.

28. The method of claim 26, wherein the pressure relief valve is a first pressure relief valve, selectively passing fluid includes passing fluid with the first pressure relief valve from a point downstream of the first plurality of control valves, and the method further includes selectively passing fluid with a second pressure relief valve from a point downstream of the second plurality of control valves to a reservoir.

29. A work machine, comprising:
a power source;
a traction device; and
a transmission driven by the power source and configured to drive the traction device at a range of output speed ratios, the transmission including:
a reservoir configured to hold a supply of fluid;
a source configured to pressurize the fluid;
a manifold configured to receive the pressurized fluid;
a plurality of control valves fluidly communicating with the manifold in parallel relation;
a plurality of fluid actuated clutches, each of the fluid actuated clutches being associated with one of the plurality of control valves;
a pressure relief valve disposed downstream of the manifold and configured to selectively fluidly communicate the manifold with the reservoir; and
a distribution line directing the pressurized fluid solely from at least one of the control valves to at least one of the fluid actuated clutches.

30. The work machine of claim 29, further including a controller in communication with each of the plurality of control valves and configured to selectively actuate the plurality of control valves in response to a predetermined condition.

31. The work machine of claim 29, wherein the manifold is a first manifold, the plurality of control valves is a first plurality of control valves, and the transmission further includes:
a second manifold configured to receive the pressurized fluid in parallel relation to the first manifold, the pressure relief valve being disposed downstream of the first and second manifolds and configured to selectively fluidly communicate both the first and second manifolds with the reservoir; and
a second plurality of control valves fluidly communicating with the second manifold in parallel relation.

32. The work machine of claim 29, wherein the manifold is a first manifold, the plurality of control valves is a first plurality of control valves, the pressure relief valve is a first pressure relief valve disposed downstream of the first manifold and configured to selectively fluidly communicate the first manifold with the reservoir, and the transmission further includes:
a second manifold configured to receive the pressurized fluid in parallel relation to the first manifold;
a second plurality of control valves fluidly communicating with the second manifold in parallel relation; and
a second pressure relief valve disposed downstream of the second manifold and configured to selectively fluidly communicate the second manifold with the reservoir.

33. The work machine of claim 29, wherein each of the plurality of control valves are located at a point gravitationally higher than the manifold.

34. A machine, comprising:
a power source;
a traction device; and
a transmission driven by the power source and configured to drive the traction device at a range of output speed ratios, the transmission including:
a reservoir configured to hold a supply of fluid;
a source configured to pressurize the fluid;
a plurality of control valves configured to receive the pressurized fluid;
a plurality of fluid actuated clutches, each of the fluid actuated clutches being associated with one of the plurality of control valves;
a pressure relief valve in fluid communication with the plurality of control valves and disposed downstream of the plurality of control valves; and
a distribution line dedicated to communicating the pressurized fluid from at least one of the control valves to at least one of the fluid activated clutches.

35. The machine of claim 34, wherein the plurality of control valves are configured to receive the pressurized fluid in series relation.

36. The machine of claim 35, further including a controller in communication with each of the plurality of control valves and configured to selectively actuate the plurality of control valves in response to a predetermined condition.

37. The machine of claim 36, wherein the predetermined condition is a desired transmission output gear ratio input by an operator.

38. The machine of claim 35, wherein the plurality of control valves is a first plurality of control valves, the transmission further includes a second plurality of control valves fluidly disposed in series relation to each other and in parallel relation to the first plurality of control valves, and the pressure relief valve is disposed downstream of the first and second plurality of control valves and is configured to selectively fluidly communicate both the first and second plurality of control valves with the reservoir.

39. The machine of claim 35, wherein the plurality of control valves is a first plurality of control valves, the pressure relief valve is a first pressure relief valve disposed downstream of the first plurality of control valves and configured to selectively fluidly communicate the first plurality of control valves with the reservoir, and the transmission further includes:
a second plurality of control valves fluidly disposed in series relation to each other and in parallel relation to the first plurality of control valves; and
a second pressure relief valve disposed downstream of the second plurality of control valves and configured to selectively fluidly communicate the second plurality of control valves with the reservoir.

* * * * *